United States Patent
D'Arbonneau et al.

(10) Patent No.: US 10,814,984 B2
(45) Date of Patent: Oct. 27, 2020

(54) DEVICE FOR WAKING UP A CREW MEMBER OF AN AIRCRAFT

(71) Applicant: DASSAULT AVIATION, Paris (FR)

(72) Inventors: François-Xavier D'Arbonneau, Saint Cloud (FR); Patrick Darses, Istres (FR); Bruno Ferry, Istres (FR); François Salmon-Legagneur, Saint Cloud (FR); Jean-Christophe Denjean, Merignac (FR)

(73) Assignee: DASSAULT AVIATION, Paris (FR)

( * ) Notice: Subject to any disclaimer, the term of this patent is extended or adjusted under 35 U.S.C. 154(b) by 0 days.

(21) Appl. No.: 16/413,768

(22) Filed: May 16, 2019

(65) Prior Publication Data

US 2019/0352008 A1 Nov. 21, 2019

(30) Foreign Application Priority Data

May 16, 2018 (FR) ...................................... 18 00477

(51) Int. Cl.
*G08G 5/00* (2006.01)
*B64D 11/00* (2006.01)

(52) U.S. Cl.
CPC ................. *B64D 11/0015* (2013.01)

(58) Field of Classification Search
CPC ........... A61B 5/16; A61B 5/4812; A61B 5/11; A61B 5/4806; A61B 5/18; A61B 5/162; A61B 5/4809; A61B 2560/0242; A61B 2562/0204; A61B 3/113; A61B 5/002; A61B 5/02055; A61B 5/024; A61B 5/02444; A61B 5/0476; A61B 5/08; A61B 5/4266; A61B 5/6803; A61B 5/7282; A61B 5/742; A61B 7/04; G16H 50/50; G16H 10/60; G16H 15/00; A61K 2300/00; A61K 31/00; A61K 31/4985; A61K 31/519; A61K 31/53; Y02A 90/26; B64D 11/0015;
(Continued)

(56) References Cited

U.S. PATENT DOCUMENTS 5,402,190 A * 3/1995 Waldman ............... G02C 5/001
351/159.63
5,928,133 A * 7/1999 Halyak .................... A61B 5/02
340/575
(Continued)

FOREIGN PATENT DOCUMENTS

EP          3141483 A1    3/2017
WO       WO0166006 A1    9/2001

OTHER PUBLICATIONS

Search Report for priority application FR1800477.

*Primary Examiner* — Daniel Previl
(74) *Attorney, Agent, or Firm* — Davidson, Davidson & Kappel, LLC

(57) ABSTRACT

A device for waking up a crew member resting on an aircraft includes a processing unit configured to detect current development parameters of the aircraft and/or to detect a state of consciousness of at least one other active crewmember. The processing unit is also configured to activate an apparatus for waking up the resting crew member, when at least one predetermined condition for waking up the resting crew member on one or several current parameters of the aircraft and/or on a parameter representative of the state of consciousness of the at least one other active crew member is satisfied.

20 Claims, 4 Drawing Sheets

(58) Field of Classification Search
CPC ............ B64D 11/00; B64D 2011/0046; B64D 2011/0069; B64D 11/00155; B64D 11/0607; B64D 11/0624; B64D 11/0643; B64D 43/00; B64D 2045/0075; B64D 45/00; B64D 47/00; G06F 19/3481; G06F 16/3329; G06F 16/3338; G06F 16/3344; G06F 16/3347; Y10S 128/903; Y10S 128/92; A61N 2005/0648; A61N 2005/0663; A61N 2/004; G01C 23/00; G01C 23/005; G08B 21/06; A61M 2021/0027; A61M 2021/044; A61M 21/00; A61M 21/02; A61M 2205/3306; A61M 2205/332; A61M 2205/3368; A61M 2205/3375; A61M 2209/088; A61M 2230/50; A61M 2230/63; G02C 5/001; G02C 7/104; G02C 5/08; G02C 5/0816; G02C 5/0013; G02C 5/0021; G02C 5/003; G02C 5/0052

USPC ............ 340/945, 946, 948, 964, 980, 995.1, 340/995.13, 995.14, 525, 10.33, 309.16
See application file for complete search history.

(56) References Cited

U.S. PATENT DOCUMENTS

| | | | |
|---|---|---|---|
| 2001/0021800 A1* | 9/2001 | Balkin | A61B 5/16 600/300 |
| 2006/0145457 A1* | 7/2006 | Prenzel | A61N 2/004 280/735 |
| 2014/0343762 A1* | 11/2014 | Buratto | B64D 43/00 701/14 |
| 2017/0281119 A1* | 10/2017 | Stroman | A61B 7/04 |
| 2018/0292231 A1* | 10/2018 | Delle-Vedove | B64D 43/00 |

* cited by examiner

DEVICE FOR WAKING UP A CREW MEMBER OF AN AIRCRAFT

The present invention relates to a device for waking up a crew member of an aircraft.

During long flight periods, the pilots relay one another at the commands and alternate rest periods. In case of serious problems within the aircraft, it may prove necessary to wake up the sleeping pilot quickly and effectively so that he can participate with the rest of the crew in resolving the problem.

However, like for any human being, the wakeup phase is a transition that may be brutal between sleep and full consciousness.

BACKGROUND

The known ways of waking up a resting pilot are the responsibility of the on board personnel, for example the flight attendant. The crew can also be assisted by everyday wakeup means, for example a household alarm clock or a telephone alarm, when the wakeup times are predictable.

SUMMARY OF THE INVENTION

Yet when serious problems occur, the pilot(s) at the commands can be under substantial stress and a heavy workload or may be unwell. Thus, the decision to wake up the sleeping pilot can be disrupted by the management of the event at the source of the situation.

For the same reasons, the synthetic description of the problem and the current situation to the newly awakened pilot can be influenced by the disrupted perceptions of the pilots at the commands during the management of the event. Additionally, the awakened pilot is affected by the abrupt awakening he has experienced, which may complicate his understanding of the problems. In these two cases, the awakened pilot is thus not able to understand the situation correctly, which may lead to piloting errors.

An object of the present disclosure is therefore to provide a device making it possible to awaken sleeping crew members appropriately to guarantee maximum safety of the aircraft.

To that end, a wakeup device of the aforementioned type is provided, comprising a processing unit configured to detect current development parameters of the aircraft and/or to detect a state of consciousness of at least one other active crewmember; the processing unit also being configured to activate an apparatus for waking up said resting crew member, when at least one predetermined condition for waking up the resting crew member on one or several current parameters of the aircraft and/or on a parameter representative of the state of consciousness of said at least one other active crew member is satisfied.

The wakeup device according to embodiments of the invention may comprise one or more of the following features, considered alone or according to any technically possible combination:

- the wakeup device is a device for waking up a crew member, the crew member being on the aircraft;
- the current parameters and the parameter representative of the state of consciousness of the other active crew member are parameters calculated from sensor measurements of the aircraft;
- the device comprises a display unit, the processing unit being configured to display, on the display unit intended for said resting crew member, situation information associated with the satisfied predetermined condition;
- the situation information associated with the satisfied predetermined wakeup condition comprises at least one message for implementing an urgent action that said resting crew member must perform upon waking up;
- the processing unit comprises a memory comprising a database of predetermined wakeup conditions and urgent action messages, each predetermined wakeup condition being associated with at least one of the urgent action messages, the processing unit being configured to display, on the display unit, when one of the predetermined wakeup conditions is satisfied, said urgent action message associated with said satisfied predetermined wakeup condition;
- the situation information associated with the satisfied predetermined wakeup condition comprises at least one temporal evolution of at least one of the parameters used to satisfy the predetermined wakeup condition;
- the processing unit comprises a memory and is able to record, in the memory, a history of current parameters during a flight phase of the aircraft and/or a history of the parameter representative of the state of consciousness of said at least one other active crew member, the processing unit being configured to display, on the display unit intended for said resting crew member, a history of current parameters stored in the memory and/or a history of the parameter representative of the state of consciousness of said at least one other active crew member;
- the device comprises at least one interface for manual activation of the wakeup apparatus by another person on board the aircraft;
- the processing unit is configured to activate the wakeup apparatus at a predetermined moment;
- the device comprises a plurality of different wakeup apparatuses, the processing unit being configured to activate at least a first wakeup apparatus from among the plurality of wakeup apparatuses in a gentle wakeup mode, and to activate at least a second wakeup apparatus, not activated during the gentle wakeup mode, in an emergency wakeup mode;
- the processing unit is configured to send activation information from the wakeup apparatus to at least another active crew member, when the predetermined condition is satisfied;
- the device comprises actionable wakeup acknowledgment means, the processing unit being configured to create activation information of the acknowledgment means to the attention of at least one other active crew member when the acknowledgment means are actuated;
- the device comprises means for detecting a state of consciousness of the resting crew member intended to be woken up by the wakeup device, the state of consciousness being an asleep state or an awake state, the processing unit being configured to create activation information of the detection means to the attention of at least one other active crew member, when the state of consciousness detected by the detection means is the awake state;
- the wakeup device further comprises a support intended to provide a rest surface for said resting crew member;
- the actionable wakeup apparatus is able to stimulate the resting crew member positioned on said rest surface;
- the support intended to form a rest surface is situated at a distance from the cockpit of the aircraft; and
- the display unit is positioned opposite the support.

An aircraft comprising the wakeup device is also provided.

Furthermore, a method is provided for waking up a resting crew member comprising the following steps:

providing a wakeup device as described above;

activating the wakeup apparatus of the wakeup device, when at least one predetermined condition for waking up the resting crew member on current parameters of the aircraft and/or on a parameter representative of a state of consciousness of at least one other active crew member is satisfied.

According to one preferred embodiment of the invention, the wakeup method includes the display, by the processing unit, on a display unit and intended for said resting crew member, of situation information associated with the satisfied predetermined condition.

Optionally, the display unit is positioned opposite the support.

BRIEF SUMMARY OF THE DRAWINGS

The invention will be better understood upon reading the following description, provided solely as an example and done in reference to the appended drawings, in which.

DETAILED DESCRIPTION

Figure 1:
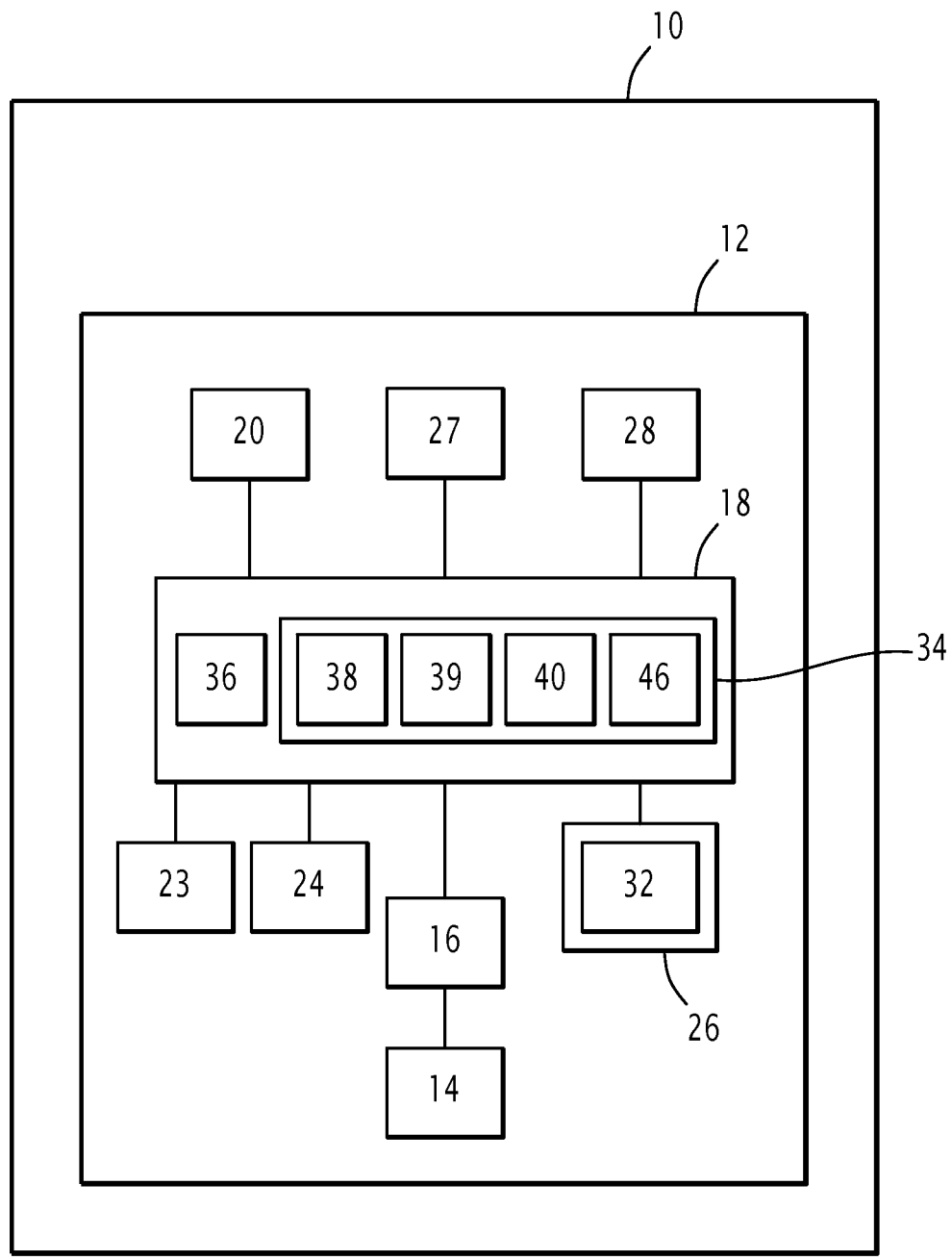
FIG. 1 is a schematic view of an aircraft comprising a first wakeup device according to an embodiment of the invention.

An aircraft 10 according to an embodiment of the invention is schematically illustrated in FIG. 1.

An aircraft 10 typically comprises more crewmembers than strictly necessary to pilot the aircraft 10, and during a flight, at least one of said crew members is resting while the others are active according to the rules defined by each airline.

"Resting crew member" refers to a crew member who has interrupted the professional activities related to his position to rest during a predetermined rest period. Conversely, "active crew member" refers to a crew member who is performing the professional activities related to his position during a predetermined active period.

The aircraft 10 comprises a wakeup device 12 for the resting crew member according to a first embodiment.

The aircraft 10 also comprises a cockpit in which the active crew members are typically located and pilot the aircraft 10.

Figure 2:
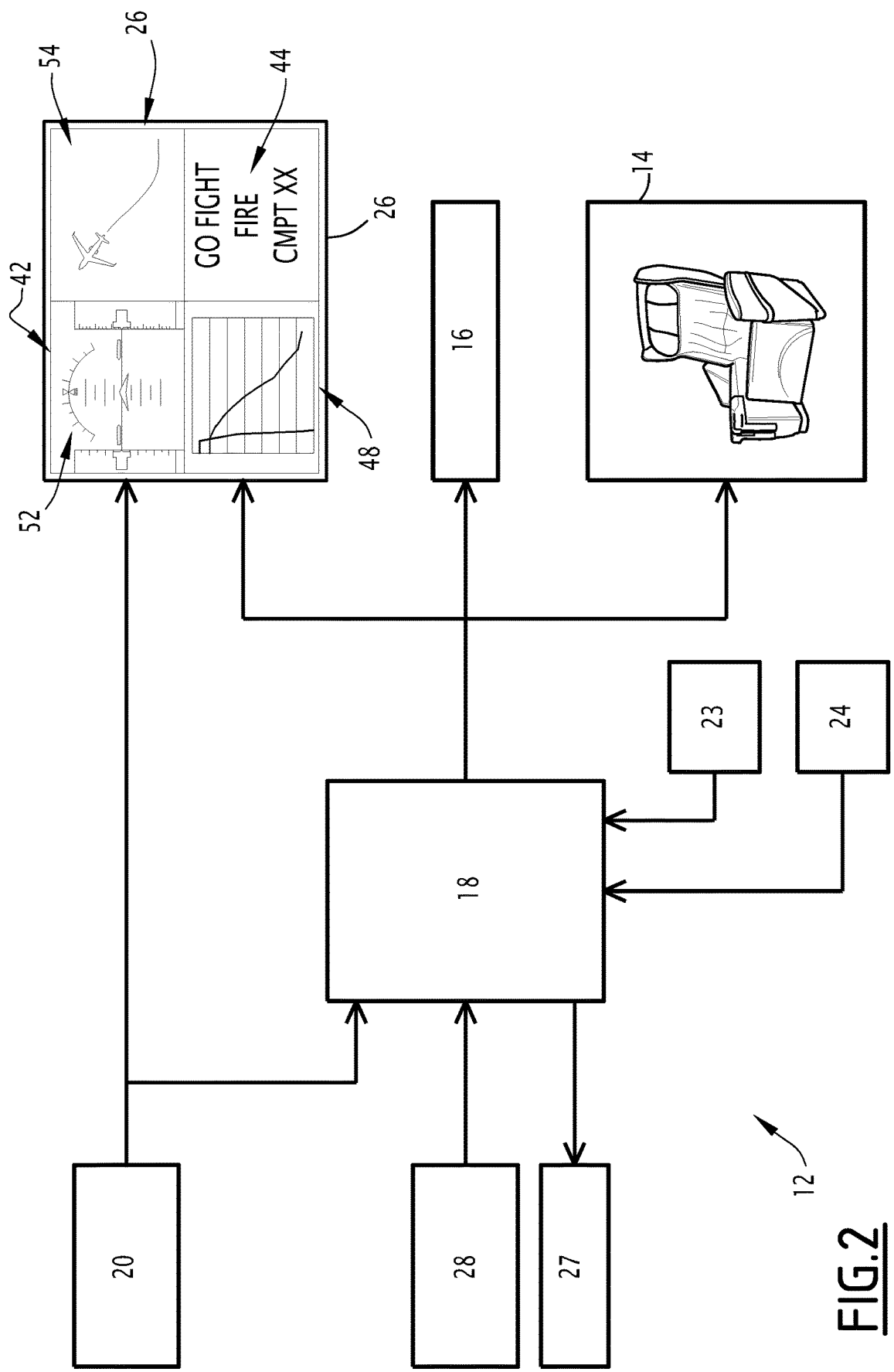
FIG. 2 is a schematic view of the first wakeup device of FIG. 1.

The first wakeup device 12 is illustrated in more detail in FIGS. 1 and 2.

The first wakeup device 12 comprises a support 14 intended to provide a rest surface for the resting crew member, an actionable wakeup apparatus 16 for the resting crew member and a processing unit 18.

The first wakeup device 12 also comprises a plurality of sensors 20 configured to measure current parameters of the aircraft 10.

The first wakeup device 12 preferably comprises detection means 23 for detecting the state of consciousness of the resting crew member and, additionally or as a variant, actionable means for acknowledging the wakeup 24.

It also advantageously comprises a display unit 26.

The first wakeup device 12 additionally comprises an information distribution device 27 for distributing information to active crew members.

The first wakeup device 12 further preferably comprises at least one interface 28 for manual activation of the wakeup apparatus 16 by another person on board the aircraft 10. Advantageously, the first wakeup device 12 comprises a plurality of manual activation interfaces 28.

The support 14 is for example an armchair or a bed.

The actionable wakeup apparatus 16 is capable of stimulating the resting crew member intended to be woken up, in particular the resting crew member when he is positioned on the rest surface.

For example, the wakeup apparatus 16 is able to act on or opposite the rest surface to stimulate the resting crew member.

"Actionable" means that the wakeup apparatus 16 has at least one activated configuration, in which the wakeup apparatus 16 stimulates the resting crew member positioned on the support 14.

The wakeup apparatus 16 is for example separate and at a distance from the display unit 26. "Separate" means that the wakeup apparatus 16 is not formed by the display unit 26.

The wakeup apparatus 16 is for example an illuminated wakeup apparatus configured to spread light when it is activated.

In this example, it is preferably formed by the typical illumination device of the zone of the aircraft in which the support 14 is arranged. In this case, the illumination device is also for example manually controllable by a person on board the aircraft 10, in particular via a switch positioned in this zone.

The wakeup apparatus 16 is able to vary the intensity of the stimulation of the resting crew member.

In particular here, the wakeup apparatus 16 is able to vary the intensity of the light that is spread when it is activated.

At least one of the sensors 20 is for example configured to measure the altitude, the acceleration and/or the speed of the aircraft 10. At least one of the sensors 20 is for example configured to measure the pressure inside the aircraft 10.

At least one of the sensors 20 is for example configured to detect the operating state of a piece of equipment of the aircraft 10, in particular to detect a failure of the equipment.

At least one of the sensors 20 is for example a smoke detector or a fire detector.

Furthermore, at least one of the sensors 20 is for example configured to detect a state of consciousness of at least one or each of the active crew members, the state of consciousness being either a conscious state, or an unconscious state, of said active crew member. Said at least one of the sensors 20 is in this case for example configured to measure physiological characteristics of said active crew member, such as the heart rate, configured to detect movements of said active crew member, and/or is an eye tracking sensor configured to detect the opening, blinking and movements of the eyes of said active crew member.

The detection means 23 for detecting the state of consciousness of the resting crew member are configured to detect a state of consciousness of the resting crew member intended to be woken up by the first wakeup device 12.

The state of consciousness is an asleep state or an awake state of the resting crew member.

The detection means 23 for example comprise sensors configured to measure physiological characteristics of the resting crew member, such as the heart rate, sensors configured to detect movements of the resting crew member, and/or eye tracking sensors configured to detect the opening, blinking and movements of the eyes of the resting crew member.

The acknowledgment means 24 are actionable by the resting crew member intended to be woken up.

The acknowledgment means 24 are intended to allow the resting crew member to indicate to the active crew members that he is awake.

The acknowledgment means 24 are, in one example embodiment, implanted in the support 14, for example in pushbutton form.

The display unit 26 is able to display images.

The display unit 26 is positioned opposite the support 14.

The resting crew member can thus see the display unit 26 when he wakes up, even when he is still on the support 14.

The display unit 26 for example comprises a screen 32.

The information broadcasting device 27 for broadcasting information to active crew members is positioned in the cockpit.

The information broadcasting device 27 for example comprises a display screen and/or a speaker.

At least one of the manual activation interfaces 28 is for example positioned in the cockpit and is in particular actionable by one of the active crew members piloting the aircraft 10.

One of the manual activation interfaces 28 is for example actionable by still another person on board the aircraft, such as a passenger of the aircraft 10 or a crew member of the aircraft 10 different from the active crew members intended for piloting, for example a flight attendant.

As illustrated in FIGS. 1 and 2, the processing unit 18 is connected to the wakeup apparatus 16. It is additionally connected to said sensors 20, the display unit 26, the detection means 23, the acknowledgment means 24, the or each manual activation interface 28, and the information broadcasting device 27 for broadcasting information to the active crew members.

The processing unit 18 is configured to detect current development parameters of the aircraft 10, and to detect a state of consciousness of at least one other active crew member.

The processing unit 18 is also configured to activate the wakeup apparatus 16, when at least one predetermined condition for waking up the resting crew member on one or several current parameters of the aircraft 10 and/or on a parameter representative of a state of consciousness of said at least one other active crew member is satisfied.

To that end, the processing unit 18 comprises a memory 34 and a processor 36, the processor 36 being suitable for executing modules contained in the memory 34.

The processing unit 18 is capable of recording, in the memory 34, a history of current parameters during a flight phase of the aircraft 10 and/or a history of the parameter representative of the state of consciousness of said at least one other active crew member.

The memory 34 comprises a module 38 for managing the wakeup of the resting crew member, a database 39 of predetermined wakeup conditions and a module 40 for providing information to the resting crew member.

The module 38 for managing the wakeup is configured to activate the wakeup apparatus 16 at a predetermined moment. The predetermined moment for example corresponds to the end of the rest period allocated to the resting crew member.

In one embodiment, the module 38 for managing the wakeup is configured to calculate the predetermined wakeup moment as a function of the start time of the rest period and as a function of the circadian rhythm of the resting crew member.

In this way, the resting crew member can thus be woken up in a scheduled manner, for example at the end of his rest period.

The module 38 for managing the wakeup is also configured to activate the wakeup apparatus 16, when at least one manual activation interface 28 is activated.

When at least one manual activation interface 28 is activated, the module 38 for managing the wakeup is advantageously configured to activate the wakeup apparatus 16 so that it has a stimulation intensity of the resting crew member greater than a stimulation intensity of the wakeup apparatus when it is activated at a predetermined moment.

An active crew member or any other person on board the aircraft 10 is thus able to wake up the resting crew member, when he deems it necessary.

Furthermore, the module 38 for managing the wakeup of the resting crew member is configured to detect current development parameters of the aircraft 10, and/or to detect a state of consciousness of at least one other active crew member and to activate the wakeup apparatus 16, when at least one predetermined wakeup condition for the resting crew member on one or several current parameters of the aircraft 10 and/or on a parameter representative of the state of consciousness of said other active crew member is satisfied.

In particular, the wakeup management module 38 is configured to detect said current parameters and the parameter representative of the state of consciousness of said other active crew member for example by means of said sensors 20 of the aircraft 10. The current parameters and the parameter representative of the state of consciousness are then parameters determined from measurements of said sensors 20 of the aircraft 10.

The current parameters for example comprise the measured altitude, the measured acceleration, and the measured speed of the aircraft 10.

The current parameters for example comprise the pressure measured inside the aircraft 10.

They also for example comprise current parameters representative of the operating state of a piece of equipment of the aircraft 10.

Furthermore, the current parameters for example comprise current parameters representative of the detection of smoke or fire inside the aircraft 10.

Furthermore, the parameter representative of the state of consciousness of said other active crew member is for example either representative of a state of consciousness of said active crew member, or representative of a state of unconsciousness of said active crew member.

Each predetermined wakeup condition is representative of the appearance of a serious problem experienced by the aircraft 10 that requires waking up the resting crew member.

A predetermined wakeup condition is for example:
a measured altitude of the aircraft 10 is below a minimum threshold altitude or above a maximum threshold altitude;
a measured speed of the aircraft 10 is below a minimum threshold speed or above a maximum threshold speed;

a measured acceleration of the aircraft 10 is above a maximum threshold acceleration;

a pressure measured inside the aircraft 10 is below a minimum threshold pressure;

smoke or a fire is detected in a zone inside the aircraft 10;

a piece of equipment of the aircraft 10 has failed; and the parameter representative of the detected state of consciousness of one of the active crew members is representative of an unconscious state.

In a variant, the predetermined wakeup condition is representative of an engine problem, the appearance of a conditioning failure, a failure of the automatic pilot or flight controls, or a failure of the communications devices of the active crew members with the outside of the aircraft 10.

The database 39 of predetermined wakeup conditions includes at least one table linking states and values of current parameters of the aircraft 10, and states and values of parameters representative of the state of consciousness of each active crew member, in particular measured by the sensors 20, with the predetermined conditions specified above. The table is able to be queried at regular intervals, for example at a frequency greater than 10 Hz, by the wakeup management module 38.

When at least one predetermined wakeup condition is satisfied, the module 38 for managing the wakeup is advantageously configured to activate the wakeup apparatus 16 so that it has a stimulation intensity of the resting crew member greater than a stimulation intensity of the wakeup apparatus when it is activated at a predetermined moment.

When a predetermined wakeup condition is satisfied, the wakeup management module 38 is configured to activate the wakeup apparatus 16 as a priority over any manual command from the wakeup apparatus 16 by a person on board the aircraft 10.

The wakeup management module 38 is also configured to create and send activation information from the wakeup apparatus 16 to the attention of at least one of the active crew members, when a predetermined wakeup condition is verified.

The activation information of the wakeup apparatus 16 for example comprises a visual message intended to be displayed by the information broadcasting device 27 for the active crew members. As a variant or additionally, the activation information of the wakeup apparatus 16 comprises an audio message intended to be broadcast by the information broadcasting device 27.

The active crew members are thus informed by the visual and/or audio message when the wakeup apparatus 16 is activated.

For example, the wakeup management module 38 is also configured to send the activation information of the wakeup apparatus 16 to the attention of a crew member of the aircraft 10 different from said crew members intended for piloting, for example a flight attendant.

Other people on board the aircraft 10 are thus informed when the wakeup apparatus 16 is activated.

The wakeup management module 38 is further for example configured to create and send activation information of the detection means 23 to the attention of said active crew members, when the state of consciousness detected by the detection means 23 is the awake state.

The activation information of the detection means 23 for example comprises a visual message intended to be displayed by the information broadcasting device 27 for the active crew members. As a variant or additionally, the activation information of the detection means 23 comprises an audio message intended to be broadcast by the information broadcasting device 27.

The wakeup management module 38 is for example configured to create and send activation information of the acknowledgment means 24 to the attention of at least one of said active crew members when the acknowledgment means 24 are actuated.

The activation information of the acknowledgment means 24 for example comprises a visual message intended to be displayed by the information broadcasting device 27 for the active crew members. As a variant or additionally, the activation information of the acknowledgment means 24 comprises an audio message intended to be broadcast by the information broadcasting device 27.

In this way, the active crew members are informed by the visual and/or audio message(s) when the resting crew member is indeed awake.

The wakeup management module 38 is configured to record, in the memory 34, a history of the current parameters and/or a history of the parameter representative of the state of consciousness of said other active crew member, during a flight phase of the aircraft 10, in particular during a flight phase during which a predetermined wakeup condition has been verified.

The module 40 for providing information to the resting crew member is configured to display information, images and a graphic interface on the display unit 26, and to manage this graphic interface, for example via entry means, not shown.

It is capable of creating a depiction of the graphic interface and updating this graphic interface, for example in response to actions by the resting crew member.

Figure 3:
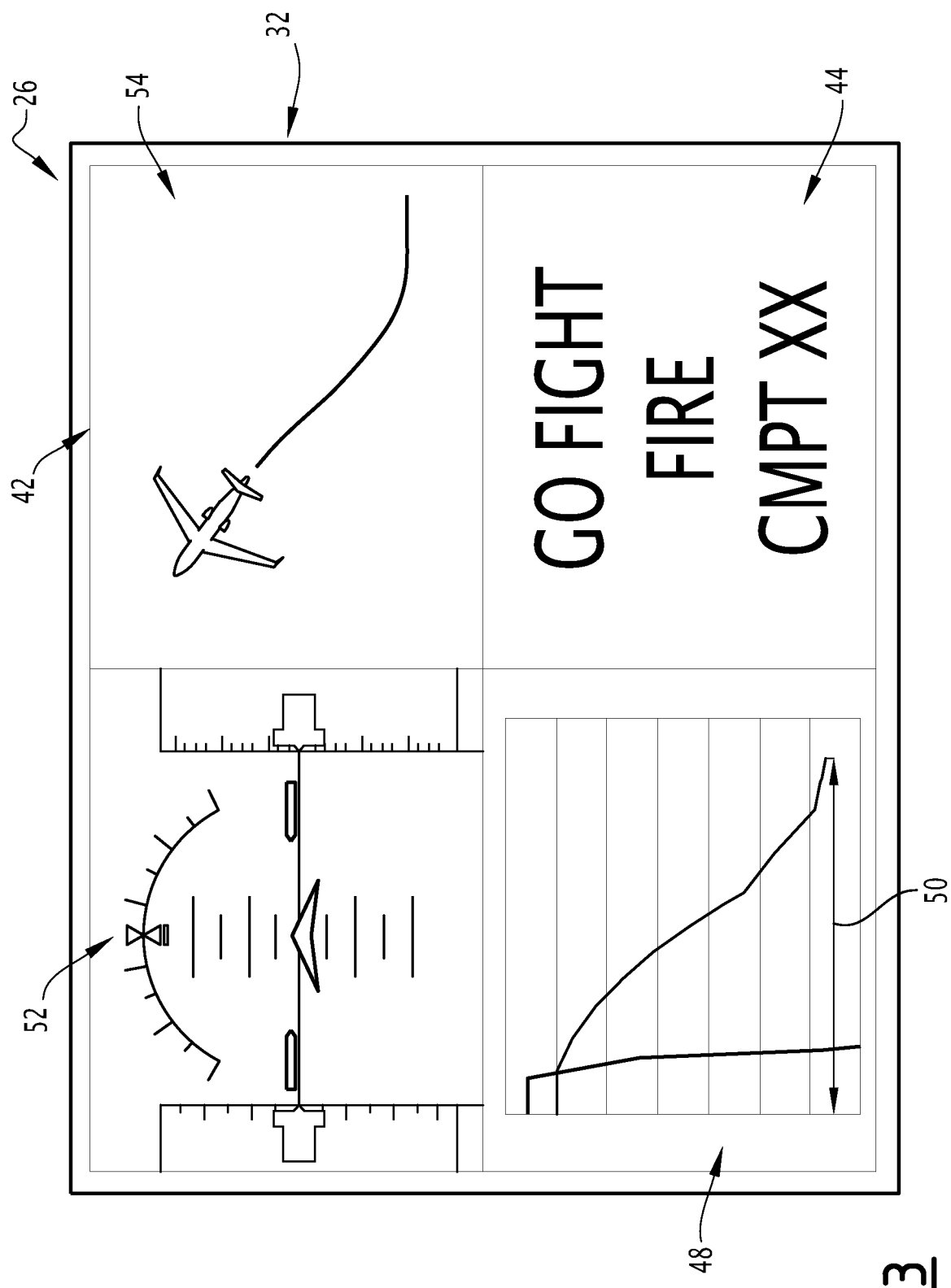
FIG. 3 is a schematic view of the display unit of the first wakeup device of FIG. 1.

As illustrated in FIG. 3, the module 40 for providing information is configured to display, on the display unit 26 for said resting crew member, situation information 42 associated with the or each satisfied predetermined condition.

The situation information 42 is relevant with respect to the satisfied predetermined condition.

The module 40 for providing information is configured to update the situation information 42 at regular time intervals.

As illustrated in FIG. 3, the situation information 42 comprises at least one message 44 for implementing an urgent action that said resting crew member must perform upon waking up.

The urgent action message 44 is suitable for the understanding of the resting crew member who has just woken up.

For example, the urgent action message 44 comprises at least one action verb, and an indication of a location in the aircraft 10.

The urgent action message 44 may include abbreviated words.

The urgent action message 44 for example comprises fewer than 10 words.

The urgent action message 44 is thus easily comprehensible by the resting crew member who has just woken up.

In the example illustrated in FIG. 3, the predetermined wakeup condition that is verified is representative of a detection of a fire in a zone designated under the name "compartment XX", the situation information 42 displayed by the module 40 for providing information on the display unit 26 comprises the urgent action message 44, in English, "GO FIGHT FIRE CMPT XX". In FIG. 3, the urgent action message 44 is written in English, according to aeronautics standards.

More generally, the memory 34 comprises a database 46 of predetermined wakeup conditions and urgent action messages 44.

In the database 46, each predetermined wakeup condition is associated with at least one of the urgent action messages 44.

The module 40 for providing information is configured to display, on the display unit 26, when one of the predetermined wakeup conditions is satisfied, said urgent action message 44 associated with said satisfied predetermined condition.

The situation information 42 associated with the satisfied predetermined wakeup condition for example also comprises the real-time value of the parameters used to satisfy the predetermined wakeup condition. Here and in the remainder of the document, "parameters used to satisfy the predetermined wakeup condition" means current parameters and/or parameters representative of the state of consciousness of each active crew member.

In one example that is not illustrated where the satisfied predetermined condition is representative of an engine problem, the displayed situation information 42 comprises the real-time value of the engine state.

As illustrated in FIG. 3, the situation information 42 associated with the satisfied predetermined condition also for example comprises at least one temporal evolution 48 of the parameters used to satisfy the predetermined wakeup condition.

For each parameter used to verify the predetermined condition, the temporal evolution 48 is for example the evolution of the value of said parameter over a predetermined time period 50 up to the moment at which the predetermined wakeup condition is satisfied or until the actual time.

The module 40 for providing information is capable of modifying said predetermined time period 50 as a function of an action by the resting crew member, and updating the displayed temporal evolution 48 as a function of the predetermined time period 50 modified by the resting crew member.

Furthermore, the situation information 42 for example comprises at least one other current parameter that is not used in determining the predetermined condition.

This other current parameter is chosen to be relevant for the understanding of the problem at the source of the verification of the satisfied predetermined condition.

Thus, in an example that is not illustrated where the predetermined wakeup condition is representative of a pressure measured inside the aircraft 10 that is below a minimum threshold pressure, the situation information 42 also comprises the altitude measured in real-time of the aircraft 10, in addition to the current parameter that is used to satisfy the predetermined condition, namely the measured pressure.

The resting crew member thus has access upon waking up to any current parameter that is relevant to grasp the situation.

In the database 46, at least one, preferably each predetermined wakeup condition is for example associated with at least one other current parameter that is not used to determine the predetermined condition.

The module 40 for providing information is for example configured to display, on the display unit 26, when one of the predetermined wakeup conditions is satisfied, said other current parameter that is not used to determine the predetermined condition but that is associated with the satisfied predetermined condition.

Furthermore, the situation information 42 for example comprises real-time piloting information 52, and real-time navigation information 54 in particular comprising a map with an outline of the past navigation.

Figure 4:
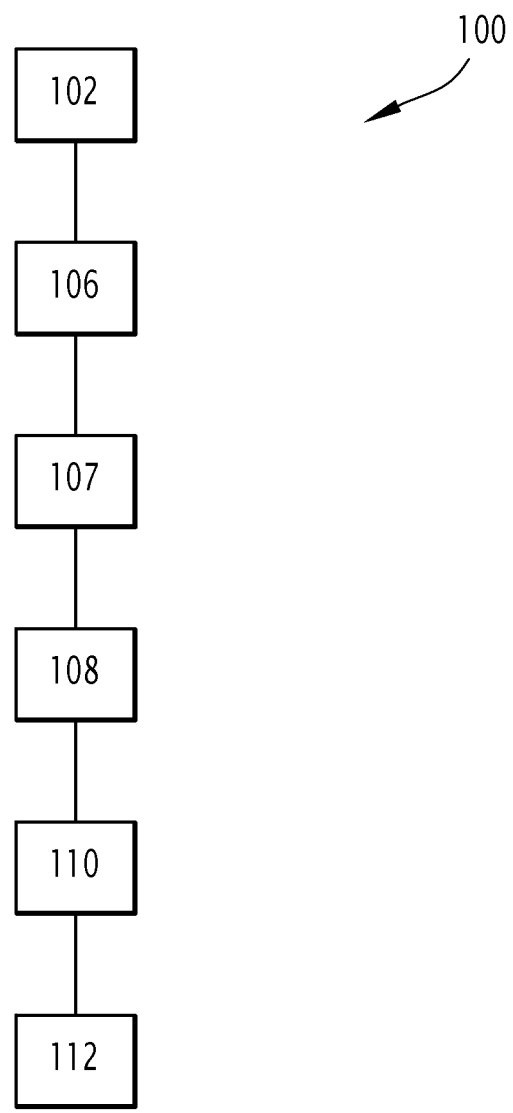
FIG. 4 is a flowchart of a first method for waking up a resting crew member implemented by the first wakeup device of FIG. 1.

A first method 100 for waking up a resting crew member will now be described, in light of FIGS. 2 and 4.

The first method 100 comprises providing 102 the first wakeup device 12.

The first method 100 comprises determining 106 current parameters of the aircraft 10.

The determination 106 of the current parameters is implemented via sensors 20.

The determination 106 of the current parameters and of parameters representative of the state of consciousness of each active crew member is implemented continuously, i.e., these parameters are determined at regular time intervals throughout the entire flight of the aircraft 10.

The first method 100 comprises, at each of the time intervals, querying 107 the table linking states and values of the parameters to the predetermined conditions.

The first method 100 comprises a step 110 for activating the wakeup apparatus 16, implemented at a predetermined moment, either when at least one of the manual activation interfaces 28 is activated, or when at least one predetermined condition for waking up a resting crew member on current parameters of the aircraft 10 is satisfied.

The wakeup apparatus 16 is then activated and wakes up the resting crew member by light stimulation.

When the predetermined wakeup condition is satisfied, the activation of the wakeup apparatus 16 takes priority over any manual command from the wakeup apparatus 16 by a person on board the aircraft 10.

When the predetermined wakeup condition is verified, the activation step 110 simultaneously comprises sending 108 activation information from the wakeup apparatus 16 to the attention of at least one other active crew member.

The active crew members are therefore informed that the wakeup apparatus 16 has been activated, following the activation of one of the predetermined conditions.

Furthermore, the activation step 110 then comprises a step for monitoring a state of consciousness of the resting crew member, via detection means 23 and/or acknowledgment means 24 and sending activation information from the detection means 23 and/or the acknowledgment means 24 to the attention of at least one of said active crew members.

The active crew members are therefore informed that the resting crew member is awake.

The querying step 107 and the activation step 110 are for example carried out by the wakeup management module 38.

The first method 100 also comprises the display 112, on the display unit 26, for said resting crew member, situation information 42 associated with the satisfied predetermined condition.

As indicated above, the situation information 42 comprises a message 44 for implementation of an urgent action that said resting crew member must perform upon waking up, the real-time value and/or the temporal evolution 48 of the parameters satisfying the predetermined condition, the real-time value and the temporal evolution of another current parameter that is not used to determine the satisfied predetermined condition, real-time piloting information 52, and/or real-time navigation information 54.

The resting crew member who has just woken up can thus ascertain the cause of the activation of the wakeup apparatus 16, the current situation of the aircraft 10, and urgent actions to be performed.

The situation information 42 is displayed by the display unit 26 as a priority, i.e., it replaces any image previously displayed by the display unit 26.

The situation information 42 is updated at regular time intervals.

The display step 112 is for example implemented by the information supply module 40.

As a variant of the first method, the step 106 for determining parameters can be interrupted and relaunched by one of the active crew members.

As a variant of the first wakeup device 12, the wakeup apparatus 16 is a vibrating wakeup apparatus configured to vibrate the rest surface when it is activated. The wakeup apparatus 16 in this variant is configured to vary the intensity of the vibrations when it is activated.

In the first method implemented by this variant of the first wakeup device 12, when the wakeup apparatus 16 is activated, it wakes up the crew member by stimulation by vibration.

In another variant of the first wakeup device 12, the wakeup apparatus 16 is an audio wakeup apparatus configured to make a sound when it is activated, the wakeup apparatus 16 then comprising a speaker. The wakeup apparatus 16 in this other variant is configured to vary the intensity of the sound emitted when it is activated.

In the first method implemented by this other variant of the first wakeup device 12, when the wakeup apparatus 16 is activated, it wakes up the crew member by stimulation by auditory stimulation.

As still another variant of the first wakeup device 12, the wakeup apparatus 16 is a mobile wakeup apparatus configured to change the position of the rest surface.

As still another variant of the first wakeup device 12, any other wakeup apparatus 16 could be considered.

A second wakeup device, not illustrated, differs from the first wakeup device 12 in that it comprises a plurality of different wakeup apparatuses.

The plurality of wakeup apparatuses for example comprises an audio wakeup apparatus configured to emit a sound when it is activated, a vibrating wakeup apparatus configured to vibrate the rest surface when it is activated, and/or a light wakeup apparatus configured to emit light when it is activated.

The wakeup management module 38 is then configured to activate at least a first wakeup apparatus from among the plurality of wakeup apparatuses in a gentle wakeup mode.

The gentle wakeup mode is preferably the wakeup mode implemented by the wakeup management module 38 when the wakeup management module 38 activates the first wakeup apparatus at a predetermined moment.

Thus, a gentle wakeup of the resting crew member can be scheduled, for example at the end of the rest period allocated to the resting crew member, when the wakeup apparatus 16 is activated at a predetermined moment.

The wakeup management module 38 is further configured to activate at least a second wakeup apparatus, not activated in the gentle wakeup mode, in an emergency wakeup mode.

In the emergency wakeup mode, at least the first wakeup apparatus and the second wakeup apparatus are thus activated by the wakeup management module 38.

The emergency wakeup mode is preferably the wakeup mode implemented by the wakeup management module 38 when at least one predetermined wakeup condition is satisfied.

The wakeup time of the resting crew member is thus reduced when at least one predetermined wakeup condition is satisfied, i.e., when a serious problem experienced by the aircraft 10 occurs.

Additionally or as a variant, in the emergency wakeup mode, the first wakeup apparatus is activated by the wakeup management module 38 to have a stimulation intensity of the resting crew member greater than a stimulation intensity of the first wakeup apparatus in the gentle wakeup mode.

A second wakeup method is implemented by the second wakeup device.

The second wakeup method differs from the first wakeup method 100 in that when the step 110 for activating the wakeup apparatus is implemented at a predetermined moment, at least a first wakeup apparatus from among the plurality of wakeup apparatuses is activated in a gentle wakeup mode.

Furthermore, when the activation step 110 is carried out when at least one predetermined wakeup condition is satisfied or when at least one of the manual activation interfaces 28 is activated, the first wakeup apparatus and at least one second wakeup apparatus, not activated during the gentle wakeup mode, are activated. This activation then corresponds to the emergency wakeup mode.

In one variant, the aircraft 10 comprises a plurality of resting crew members, the wakeup device 12 comprising at least one shared actionable wakeup apparatus capable of jointly stimulating each resting crew member and/or at least one separate actionable wakeup apparatus per resting crew member. In this variant, the wakeup device 12 also for example comprises one support 14 per resting crew member.

According to the example embodiment of the invention, the wakeup management module 38 and the information supply module 40 are made in the form of software stored in the memory 34 and capable of being executed by the processor. In a variant, the wakeup management module 38 and the information supply module 40 are made at least partially in the form of programmable logic components, or in the form of dedicated integrated circuits, included in the wakeup device.

Owing to the features previously described, the wakeup device according to the invention wakes up the resting crew member when necessary, without this being the responsibility of other crew members, while guaranteeing that the woken up crew member best grasps the situation and reacts correctly.

The wakeup device provides contextualized situation information 42 that is easy to understand and therefore appropriate for a person who is waking up. This allows resting crew members to establish the situation, access the history and take the appropriate actions.

The wakeup device wakes up the resting crew member according to an appropriate mode for the situation, by developing a centralized initiation command for all of the wakeup apparatuses.

The wakeup device thus improves the safety of the aircraft.

What is claimed is:

1. A device for waking up a crew member resting on an aircraft at least while one other active pilot is actively in charge of operating the aircraft, comprising:
   a processing unit configured to detect current development parameters of the aircraft and/or to detect a state of consciousness of the active pilot;
   the processing unit also being configured to activate a wakeup apparatus for waking up the resting crew member, when at least one predetermined wakeup condition for waking up the resting crew member on one or several current parameters of the aircraft and/or on a parameter representative of the state of consciousness of the active pilot is satisfied, the wakeup apparatus being configured to wake up the resting crew member at least while the active pilot is actively in charge of operating the aircraft.

2. The device according to claim 1, wherein the current parameters and the parameter representative of the state of consciousness of the other active pilot are parameters calculated from sensor measurements of the aircraft.

3. The device according to claim 1, further comprising a display unit, the processing unit being configured to display, consequently to the activation of the wakeup apparatus, situation information intended for the resting crew member on the display unit, the situation information being associated with the satisfied at least one predetermined wakeup condition.

4. The device according to claim 3, wherein the situation information associated with the satisfied at least one predetermined wakeup condition comprises at least one message for implementing an urgent action that the resting crew member must perform upon waking up.

5. The device according to claim 4, wherein the processing unit comprises a memory comprising a database of predetermined wakeup conditions and urgent action messages, each predetermined wakeup condition being associated with at least one of the urgent action messages, the processing unit being configured to display, on the display unit, when one of the predetermined wakeup conditions is satisfied, the urgent action message associated with the satisfied predetermined wakeup condition.

6. The device according to claim 3, wherein the situation information associated with the satisfied at least one predetermined wakeup condition comprises at least one temporal evolution of at least one of the parameters used to satisfy the at least one predetermined wakeup condition.

7. The device according to claim 3, wherein the processing unit comprises a memory and is configured to record, in the memory, a history of current parameters during a flight phase of the aircraft and/or a history of the parameter representative of the state of consciousness of the at least one other active pilot, the processing unit being configured to display, intended for the resting crew member on the display unit, the history of current parameters stored in the memory and/or the history of the parameter representative of the state of consciousness of the at least one other active pilot.

8. The device according to claim 1, further comprising at least one interface for manual activation of the wakeup apparatus for waking up the resting crew member by another person on board the aircraft.

9. The device according to claim 1, wherein the processing unit is configured to activate the wakeup apparatus at a predetermined moment.

10. The device according to claim 1, further comprising a plurality of different wakeup apparatuses, the processing unit being configured to activate at least a first wakeup apparatus from among the plurality of wakeup apparatuses in a gentle wakeup mode, and to activate at least a second wakeup apparatus, not activated during the gentle wakeup mode, in an emergency wakeup mode.

11. The device according to claim 1, wherein the processing unit is configured to send activation information from the wakeup apparatus to at least another active crew member, when the at least one predetermined condition is satisfied.

12. The device according to claim 1, comprising actionable wakeup acknowledgment means, the processing unit being configured to create activation information of the acknowledgment means to the attention of at least one other active crew member when the acknowledgment means are actuated.

13. The device according to claim 1, comprising means for detecting a state of consciousness of the resting crew member intended to be woken up by the wakeup device, the state of consciousness being an asleep state or an awake state, the processing unit being configured to create activation information of the detection means to the attention of at least one other active crew member, when the state of consciousness detected by the detection means is the awake state.

14. A method for waking up a resting crew member comprising the following steps:

providing the wakeup device according to claim 1;

activating the wakeup apparatus of the wakeup device, when the at least one predetermined condition for waking up the resting crew member on the current parameters of the aircraft and/or on the parameter representative of the state of consciousness of the active pilot is satisfied.

15. The method according to claim 14, further comprising displaying, by the processing unit, on a display unit and intended for the resting crew member, situation information associated with the satisfied predetermined condition.

16. The device according to claim 1, wherein the wakeup device further comprises a support configured to provide a rest surface for the resting crew member, the wakeup apparatus being configured to wake up the resting crew member resting on the support at least while the active pilot is actively operating the aircraft.

17. The device according to claim 16, wherein the support is an armchair or a bed.

18. The device according to claim 16, wherein the support is situated at a distance from a cockpit of the aircraft.

19. The device according to claim 1, wherein the aircraft comprises a plurality of resting crew members, the device comprising at least one shared actionable wakeup apparatus configured to jointly stimulate at least two of the resting crew members which are simultaneously resting, and/or comprising at least one separate actionable wakeup apparatus per resting crew member which are simultaneously resting.

20. A device for waking up a crew member resting on an aircraft, comprising:

a processing unit configured to detect current development parameters of the aircraft and/or to detect a state of consciousness of at least one other active crewmember;

the processing unit also being configured to activate a wakeup apparatus for waking up the resting crew member, when at least one predetermined wakeup condition for waking up the resting crew member on a parameter representative of the state of consciousness of the at least one other active crew member is satisfied or when at least one predetermined wakeup condition for waking up the resting crew member on one or several current parameters of the aircraft and on a parameter representative of the state of consciousness of the at least one other active crew member is satisfied.

* * * * *